United States Patent
Xu et al.

(10) Patent No.: US 10,572,585 B2
(45) Date of Patent: Feb. 25, 2020

(54) CONTEXT-BASED LINGUISTIC ANALYTICS IN DIALOGUES

(71) Applicant: International Business Machines Corporation, Armonk, NY (US)

(72) Inventors: En Liang Xu, Beijing (CN); Chang Hua Sun, Beijing (CN); Shi Wan Zhao, Beijing (CN); Ke Ke Cai, Beijing (CN); Yue Chen, Beijing (CN); Li Zhang, Beijing (CN); Zhong Su, Beijing (CN)

(73) Assignee: International Business Machines Coporation, Armonk, NY (US)

( * ) Notice: Subject to any disclaimer, the term of this patent is extended or adjusted under 35 U.S.C. 154(b) by 0 days.

(21) Appl. No.: 15/828,033

(22) Filed: Nov. 30, 2017

(65) Prior Publication Data

US 2019/0163735 A1 May 30, 2019

(51) Int. Cl.
| | | |
|---|---|---|
| *G06F 17/27* | (2006.01) | |
| *G06K 9/62* | (2006.01) | |
| *G06N 3/08* | (2006.01) | |
| *G06F 16/332* | (2019.01) | |

(52) U.S. Cl.
CPC .......... *G06F 17/27* (2013.01); *G06F 16/3329* (2019.01); *G06K 9/6256* (2013.01); *G06N 3/08* (2013.01)

(58) Field of Classification Search
CPC .............................. G06F 17/2785; G10L 25/63
See application file for complete search history.

(56) References Cited

U.S. PATENT DOCUMENTS

| | | | |
|---|---|---|---|
| 6,658,388 B1 | 12/2003 | Kleindienst et al. | |
| 7,949,529 B2 | 5/2011 | Weider et al. | |
| 9,576,571 B2 | 2/2017 | Stewart et al. | |
| 9,984,062 B1* | 5/2018 | Strope | G06F 17/2775 |
| 2006/0129383 A1* | 6/2006 | Oberlander | G06F 17/274 704/10 |
| 2012/0284080 A1 | 11/2012 | De Oliveira et al. | |
| 2014/0074920 A1* | 3/2014 | Nowak | G06Q 50/01 709/204 |
| 2014/0337009 A1* | 11/2014 | Kau | G06F 17/274 704/9 |

(Continued)

FOREIGN PATENT DOCUMENTS

WO 2015191968 A1 12/2015

OTHER PUBLICATIONS

Jurafsky, Dan, Rajesh Ranganath, and Dan McFarland. "Extracting social meaning: Identifying interactional style in spoken conversation." Proceedings of Human Language Technologies: The 2009 Annual Conference of the North American Chapter of the ACLAC. (Year: 2009).*

(Continued)

*Primary Examiner* — Brian L Albertalli
(74) *Attorney, Agent, or Firm* — Patterson + Sheridan, LLP

(57) ABSTRACT

This disclosure provides a computer-implemented method. The method may include extracting one or more features based on a first utterance from a first interlocutor in a dialog and a second utterance from a second interlocutor in the dialog. The method may further include inferring one or more personality traits of the first interlocutor based on the one or more extracted features from the dialog.

20 Claims, 6 Drawing Sheets

(56) References Cited

U.S. PATENT DOCUMENTS

| | | | |
|---|---|---|---|
| 2015/0032672 A1* | 1/2015 | Prieditis | G06N 99/005 706/12 |
| 2015/0100157 A1 | 4/2015 | Houssin et al. | |
| 2015/0242707 A1 | 8/2015 | Wilf et al. | |
| 2016/0098480 A1* | 4/2016 | Nowson | G06F 17/2785 707/738 |
| 2016/0196258 A1* | 7/2016 | Ma | G06F 17/2785 704/8 |
| 2016/0300570 A1 | 10/2016 | Gustafson et al. | |
| 2017/0069340 A1* | 3/2017 | Nowson | G06F 17/2785 |
| 2018/0137432 A1* | 5/2018 | Chen | G10L 25/63 |
| 2018/0137855 A1* | 5/2018 | Lee | G06F 17/279 |
| 2018/0203848 A1* | 7/2018 | Perez | G10L 25/30 |

OTHER PUBLICATIONS

Liu, Fei, Julien Perez, and Scott Nowson. "A language-independent and compositional model for personality trait recognition from short texts." arXiv preprint arXiv:1610.04345 (2016). (Year: 2016).*

Su, Ming-Hsiang, Yu-Ting Zheng, and Chung-Hsien Wu. "Interlocutor personality perception based on BFI profiles and coupled HMMs in a dyadic conversation." Chinese Spoken Language Processing (ISCSLP), 2014 9th International Symposium on. IEEE, 2014. (Year: 2014).*

Su, Ming-Hsiang, Chung-Hsien Wu, and Yu-Ting Zheng. "Exploiting turn-taking temporal evolution for personality trait perception in dyadic conversations." IEEE/ACM Transactions on Audio, Speech, and Language Processing 24.4 (2016): 733-744. (Year: 2016).*

Ranganath, Rajesh, Dan Jurafsky, and Dan McFarland. "Its not you, its me: detecting flirting and its misperception in speed-dates." Proceedings of the 2009 Conference on Empirical Methods in Natural Language Processing: vol. 1-vol. 1. Association for Computational Linguistics, 2009. (Year: 2009).*

Herzig, Jonathan, et al. "Neural response generation for customer service based on personality traits." Proceedings of the 10th International Conference on Natural Language Generation. 2017. (Year: 2017).*

Chen Xing et. al., "Hierarchical Recurrent Attention Network for Response Generation," Published on: Jan. 25, 2017 [<https://arxiv.org/pdf/1701.07149.pdf>].

François Mairesse; Marilyn Walker, "Automatic Recognition of Personality in Conversation," <https://users.soe.ucsc.edu/~maw/papers/hlt06.pdf>.

* cited by examiner

CONTEXT-BASED LINGUISTIC ANALYTICS IN DIALOGUES

BACKGROUND

1. Technical Field

The present disclosure relates to inferring personality traits, and more specifically, to inferring personality traits based on dialogs.

2. Related Art

Use of language by a person may reflect his personality, and thus an amount of text data generated by the person may be collected and processed to determine the personality of the person. The text data may come from a variety of sources, such as articles, dialogs and speeches. According to a method for personality determination, a person's utterance in a dialog may be used to determine the personality of the person. By means of psycholinguistic analytics with the text data collected from the person's utterance, the personality of the person may be determined.

SUMMARY

According to an embodiment of the present disclosure, there is provided a computer-implemented method. The method may include generating one or more features based on a first utterance from a first interlocutor in a dialog and a second utterance from a second interlocutor in the dialog. The method may further include determining a personality of the first interlocutor based on the one or more features.

According to another embodiment of the present disclosure, there is provided a system, which may include one or more processors and a memory coupled to at least one of the one or more processors. The system may further include a set of computer program instructions stored in the memory and executed by at least one of the one or more processors in order to perform an action of generating one or more features based on a first utterance from a first interlocutor in a dialog and a second utterance from a second interlocutor in the dialog. The system may further include a set of computer program instructions stored in the memory and executed by at least one of the one or more processors in order to perform an action of determining a personality of the first interlocutor based on the one or more features.

According to a further embodiment of the present disclosure, there is provided a computer program product. The computer program product may include a computer readable storage medium having program instructions embodied therewith. The program instructions may be executable by a device to perform a method. The method may include generating one or more features based on a first utterance from a first interlocutor in a dialog and a second utterance from a second interlocutor in the dialog. The method may further include determining a personality of the first interlocutor based on the one or more features.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, where the same reference generally refers to the same components in the embodiments of the present disclosure.

DETAILED DESCRIPTION

Figure 1:
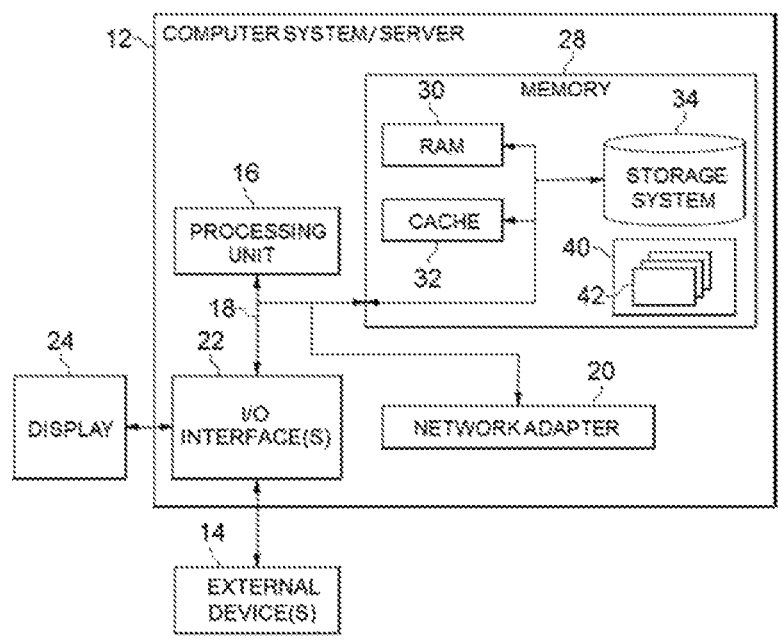
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the present disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the present disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
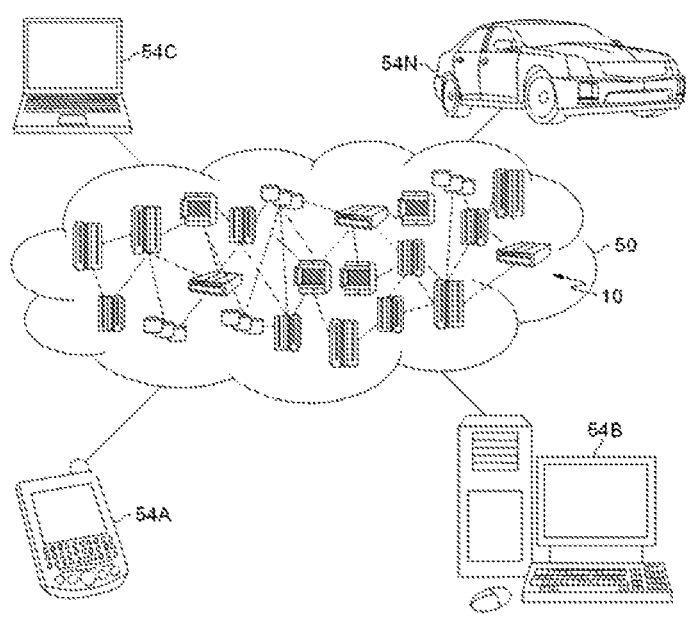
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
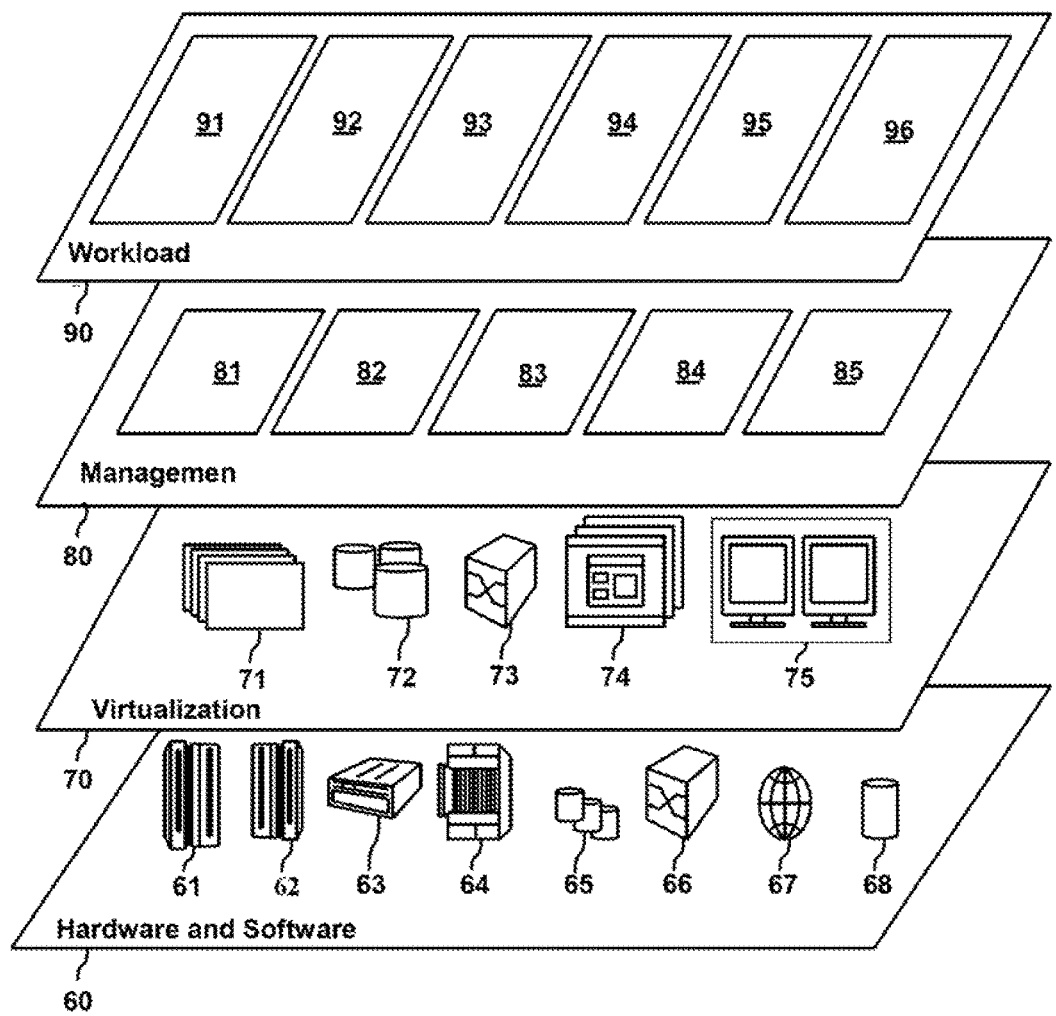
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and personality determination 96.

Some embodiments of the present disclosure may be implemented as the program/utility 40 or the program modules 42 of the computer system/server 12 of FIG. 1, or as the personality determination 96 of the workloads layer 90 of FIG. 3.

An example of personality determination will first be introduced, where the utterance of a person in a dialog is used for determining the personality of the person.

This example relates to determination of an anger proneness of the person. More specifically, angry words appearing in the person's utterance in a dialog may be counted, and the counts of the angry words may be used to determine how irritable the person is. For example, if the person's utterance includes more angry words, it may be determined that the person has a more irritable personality. Different words may have different weights in accordance to the levels of anger. For example, curse words, swear words and foul words which represent different levels of anger may be assigned with different weights.

In an example, utterances including a number (N) of words (N=10000, for example) generated by the person in a dialog are collected, and the appearance of each angry word is counted from the collected utterances. As shown in Table 1, out of the total number (N) of words, the count of curse words is $c_1$ ($c_1=30$, for example) with a weight $w_1$ ($w_1=0.4$, for example), the count of swear words is $c_2$ ($c_2=10$, for example) with a weight $w_2$ ($w_2=0.8$, for example) and the count of foul words is $c_3$ ($c_3=5$, for example) with a weight $w_3$ ($w_3=1$, for example).

TABLE 1

| Angry words | Counts | Weights |
|---|---|---|
| Curse words | $c_1 = 30$ | $w_1 = 0.4$ |
| Swear words | $c_2 = 10$ | $w_2 = 0.8$ |
| Foul words | $c_3 = 5$ | $w_3 = 1$ |

A personality score P for the anger proneness may be calculated based on the weighted sum of the counts of the words as follows. Optionally, a regulation parameter R may be used to multiply with the weighted sum to regulate the expected value of the personality score to a desired range. For example, the regulation parameter may be R=500 in this example. In this case, the higher the personality score is, the higher the anger proneness is.

$$P = \frac{R}{N}\sum_{i=1}^{3} c_i w_i = \frac{500}{10000} \times (30 \times 0.4 + 10 \times 0.8 + 5 \times 1) = 1.25. \quad \text{Equation 1}$$

However, the inventors of the present disclosure found that in real life, not only the personality of the person, but also the other participant's (to the dialog, exchange, or conversation) utterance in the dialog, may affect the language used by the person. For example, if the other participant frequently uses provoking language in the dialog, the person would be irritated and tend to use angry words in response to the other participant, even if the person is normally regarded as a peaceful person. In some other examples, a single word may have different meanings in different contexts. For example, a word may be regarded as an angry word, but may also be regarded as a joking word, depending sometimes on the utterance from the other participant in the dialog.

Therefore, personality determination based only on the person's own utterance may be inaccurate to reflect the actual personality of the person.

The present disclosure is directed to context-based personality determination in which not only a first interlocutor's own utterance, but also a second interlocutor (other participant)'s utterance in a dialog, is considered in determining the first interlocutor's personality. With reference to FIGS. 4-9, some embodiments of the present disclosure will be described below.

Figure 4:
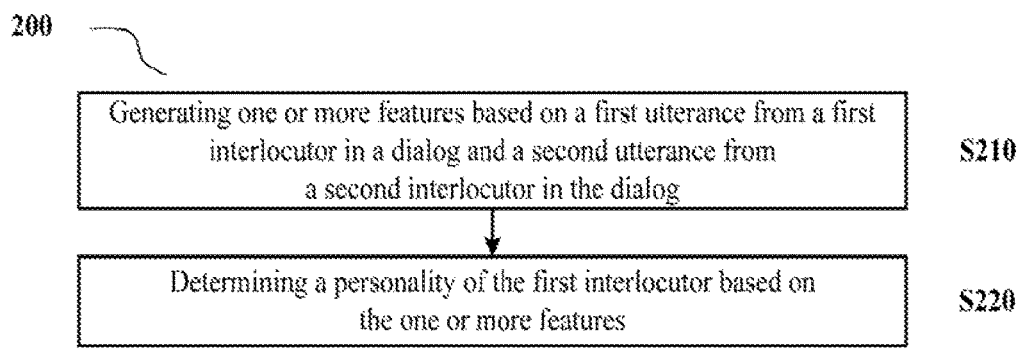
FIG. 4 is a flow chart depicting an computer-implemented method according to an embodiment of the present disclosure.

Now refer to FIG. 4, which is a flow chart showing an computer-implemented method 200 for context-based personality determination according to an embodiment of the present disclosure.

As shown in FIG. 4, the method 200 may include a feature generating step S210 and a personality determining step S220. In step S210, one or more features may be generated based on a first utterance from a first interlocutor in a dialog and a second utterance from a second interlocutor in the dialog. In step S220, a personality of the first interlocutor may be determined based on the one or more features generated in step 210.

In some embodiments, each of the first and second interlocutors may be a real person, a robot or a virtual agent such as a chatterbot. As an example, the first interlocutor may correspond to the person in the dialog as described above, and the second interlocutor may correspond to the other participant in the same dialog.

In some embodiments, the dialog may be any communication between the first and second interlocutors interacting with each other, such as a conversation or chat in a chatting software, an e-mail exchange, a message exchange via mobile phone applications, or a thread in social network sites or applications (e.g. microblogs, forums, etc.).

In some embodiments, the first and second utterances may include sentences including words, phrases, punctuations, emojis and the like expressed by the corresponding interlocutor.

It is possible to generate each of the one or more features based on both of the first utterance and the second utterance. It is also possible to generate one or some of the features based on the first utterance and to generate the other(s) of the features based on the second utterance. In some embodiments, each of the features generated in step 210 may be a numerical value or a vector or may be of any other form which carries information to characterize the first utterance and/or the second utterance.

The personality of the first interlocutor may indicate a character and a nature of the first interlocutor, and may include different dimensions. For example, the anger proneness described above may be one dimension of the personality. Other dimensions may include, for example, confidence, optimism, responsibility or the like. Some psychology models can be used to describe the dimensions of the personality, such as the Big Five personality traits, Revised NEO Personality Inventory (NEO PI-R), and the Myers-Briggs Type Indicator (MBTI). For example, the Big Five personality traits classify the personality into five dimensions: openness, conscientiousness, extraversion, agreeableness, and neuroticism. In some embodiments, each dimension of the personality may further include sub-dimensions.

In some embodiments, the personality determined in step S220 may be a numerical personality score in one or more dimensions of the personality. In another embodiment, the personality determined in step S220 may be a discrete personality level in one or more dimensions of the personality. In some embodiments, the numerical personality score of the first interlocutor may be first calculated, and then used to determine the discrete level of the personality. It is also possible to determine the discrete personality level directly by using classification methods (e.g. Logistic Regression, Support Vector Machine (SVM)) based on the feature(s).

In some embodiments, in step S220, the personality may be determined by means of a personality determination model based on the feature(s) generated in step S210. The personality determination model may be trained in advance. For example, the parameters of the personality determination model may be determined in advance by use of training samples so that the difference between the determined personality and the ground-truth personality may be as small as possible. By such training, the personality model may "learn" how the feature(s) of the utterances from the first and second interlocutors may affect the determination of the first interlocutor's personality. In other embodiments, the parameters of the personality determination model may be determined empirically.

It should be appreciated that ordinal numbers "first", "second", "third", "fourth" and the like described herein are used in order to avoid confusion among elements, and such terms do not intend to limit the precedence or number of the elements. For example, "first utterance" and "second utterance" do not intend to limit the precedence or order of the utterances, but distinguish between the utterances from the first interlocutor and the second interlocutor.

Further, although there are two interlocutors, that is, the first and second interlocutors in the dialog, involved in the method 200 of FIG. 4, it should be appreciated that the method 200 can be applied to a case in which more than two interlocutors are communicating in the same dialog. For example, the personality of the first interlocutor may be determined based not only on the first utterance from the first interlocutor, but also on two or more interlocutors communicating with the first interlocutor.

It can be seen from the above, according to the method 200, not only a first interlocutor's own utterance, but also the second interlocutor's utterance (the other participant's utterance) as context of a dialog, is considered to determine the first interlocutor's personality. In this way, the determination of the personality of the first interlocutor may be made in consideration of the context of the dialog, and the influence from the second interlocutor on the reaction of the first interlocutor may be considered, and thus the personality of the first interlocutor may be determined more accurately and be more close to the actual personality of the first interlocutor.

Figure 5:
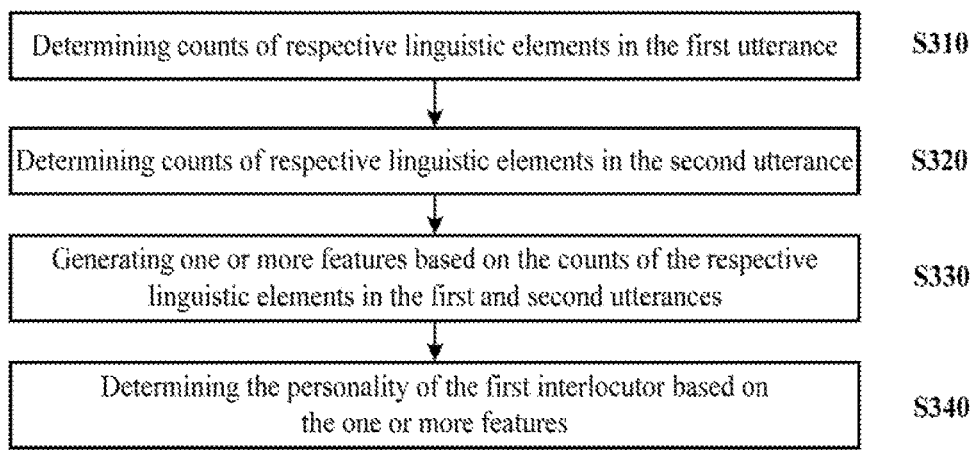
FIG. 5 is a flow chart depicting an computer-implemented method according to an embodiment of the present disclosure.

Refer now to FIG. 5, which is a flow chart showing an computer-implement method 300 for context-based personality determination according to an embodiment of the present disclosure.

The method 300 is an implementation of the method 200 in which the feature(s) is generated based on counts of respective linguistic elements in the first and second utterances. In the method 300, steps S310-S330 may correspond to and be included in the feature generating step S210 of the method 200 of FIG. 4, and step S340 of the method 300 may correspond to and be included in the personality determining step S220 of the method 200. Hereinafter, respective steps of the method 300 in FIG. 5 will be explained in detail.

In step S310, counts of respective linguistic elements in the first utterance may be determined. In step S320, counts of respective linguistic elements in the second utterance may be determined.

In some embodiments, a linguistic element may be any element such as a word, a phrase, a punctuation, an emoji and the like appearing in the utterance. In some embodiments, not all linguistic elements appearing in the first and second utterance, but only linguistic elements from a dictionary, are respectively counted. The dictionary may be constructed manually according to psycholinguistic experiences or may be an existing psychological dictionary. For example, the dictionary may be one which only includes specific elements which are considered relative to the determination of the personality, e.g. angry words for evaluation of the angry proneness. For another example, the dictionary may also be a more general dictionary such as LIWC (Linguistic Inquiry and Word Count) dictionary and thus not only specific elements but also other general elements may be counted. In another embodiment, the respective linguistic elements may include all linguistic elements in the utterance.

In some embodiments, a count vector $C_1=[c_{11}, c_{12}, \ldots, c_{1p}] \in Z^{1 \times p}$ of respective linguistic elements in the first utterance may be determined, where p denotes the number of different linguistic elements each of which is to be counted for the first utterance, Z denotes the integer field, $Z^{1 \times p}$ denotes an integer vector with a dimension of 1×p, and $c_{1i}$, $i=\{1, 2, \ldots, p\}$ denotes the count of the ith linguistic element in the first utterance.

In addition, a count vector $C_2=[c_{21}, c_{22}, \ldots, c_{2q}] \in Z^{1 \times q}$ of respective linguistic elements in the second utterance may be determined, where q denotes the number of different linguistic elements each of which is to be counted for the second utterance, $Z^{1 \times q}$ denotes an integer vector with a dimension of 1×q, and $c_{2j}$, $j=\{1, 2, \ldots, q\}$ denotes the count of the jth linguistic element in the second utterance.

In some embodiments, the respective linguistic elements to be counted in the first and second utterances may be the same (e.g. the same dictionary is used for the first and second utterances). In this case, the dimensions of the count vectors $C_1$ and $C_2$ are the same, that is, p=q. In another embodiment, the respective linguistic elements in the first and second utterances may be different from each other. In this case, the dimensions of the count vectors $C_1$ and $C_2$ may be the same or different.

In step S330, one or more features may be generated based on the counts of the respective linguistic elements in the first and second utterances.

In some embodiments, count vectors $C_1$ and $C_2$ may be cascaded as a feature vector $F=[C_1/N_1 \ C_2/N_2]^T \in R^{(p+q) \times 1}$, where R denotes the real number field, $N_1$ and $N_2$ denote the counts of all linguistic elements appearing in the first utterance and the second utterance respectively. $N_1$ and $N_2$ are used for normalization of count vectors $C_1$ and $C_2$ respectively.

It should be appreciated that the feature(s) may also be designed in other forms based on the counts of the respective linguistic elements in the first and second utterances, as long as the feature(s) can reflect the frequencies of respective different linguistic elements appearing in the first and second utterances from the first and second interlocutors respectively. For example, although the feature vector representing the information of the counts of respective linguistic elements in both of the first and second utterances (e.g. $F=[C_1/N_1 \ C_2/N_2]^T \in R^{(p+q) \times 1}$) is used in the above example, it is also possible to use two feature vectors to each represent the information of the counts of respective linguistic elements in each of the first and second utterances respectively (e.g. $F_1=[C_1/N_1]^T \in R^{p \times 1}$ and $F_2=[C_2/N_2]^T \in R^{q \times 1}$).

In step S340, the personality of the first interlocutor may be determined based on the one or more features which have been determined in step S330.

In some embodiments, step S340 may include calculating a personality score of the first interlocutor based on a linear transform of the feature(s).

For example, the personality score may be calculated as a weighted sum of elements in the feature vector. For example, a weight vector $W_1=[w_{11}, w_{12}, \ldots, w_{1p}] \in R^{1 \times p}$ for respective linguistic elements in the first utterance and a weight vector $W_2=[w_{21}, w_{22}, \ldots, w_{2q}] \in R^{1 \times q}$ for respective linguistic elements in the second utterance may be determined, where $w_{1i}$, $i=\{1, 2, \ldots, p\}$ denotes the weight for the ith linguistic element in the first utterance, and $w_{2j}$, $j=\{1, 2, \ldots, q\}$ denotes the weight for the jth linguistic element in the second utterance.

The personality score $P_1$ may be computed using the following expression based on the feature vector $F=[C_1/N_1 \ C_2/N_2]^T$ and the weight vector W, where the weight vector $W=[W_1 \ W_2]^T \in R^{(p+q) \times 1}$.

$$P_1 = RF^T W = \frac{R}{N_1} C_1 W_1^T + \frac{R}{N_2} C_2 W_2^T \quad \text{Equation 2}$$

In this embodiment, the calculated personality score is a numerical value which may correspond to one dimension of the personality of the first interlocutor weight vectors.

In some embodiments, a personality score vector corresponding to more than one dimension of the personality may be calculated based on a linear transform of the feature(s).

For example, a weight matrix $W_1 \in R'^{\times p}$ of respective linguistic elements in the first utterance and a weight matrix $W_2 \in R'^{\times q}$ of respective linguistic elements in the second utterance may be determined, where r denotes the number of dimensions of the personality, and each row in the r rows of the weight matrixes $W_1$ and $W_2$ may correspond to a weight vector for one dimension of the personality. The personality score vector $P_1 \in R^{1 \times r}$ of the first interlocutor may be calculated using the above Expression 2, where each column in the vector $P_1$ corresponds to a personality score for one dimension of personality.

In an implementation in which there are two or more features generated in step S330, different weight vectors or weight matrices may be used for the different features respectively, and the linear transformation may be performed based on the two or more features and the respective weight vectors or weight matrices.

In some embodiments, the personality score of the first interlocutor may also be calculated based on a non-linear transform of the feature(s) or other types of processing of the feature(s), as long as the feature(s) embodying the utterances of both the first and second interlocutors may function properly in determining the first interlocutor's personality.

In some embodiments, step S340 may include determining a discrete personality level based on the feature(s).

In an embodiment, the personality score of the first interlocutor may be first calculated as described in the above, and then be used to determine the discrete level of the personality. The calculated personality score may be compared to a predetermined personality threshold to determine the personality level. For example, if the angry score is between 0~0.1, the angry level may be determined to be level 1 (not irritable), and if the angry score is above 0.8, the angry level may be determined to be level 5 (extremely irritable).

In another embodiment, the personality level may be determined based directly on the feature(s) using classification models in machine learning methods, such as Logistic Regression, Support Vector Machine (SVM).

Hereafter, a specific example of the method 300 for context-based personality determination according to an embodiment of the present disclosure will be described. This example relates to determination of an anger proneness of the first interlocutor, similar to the example discussed above with Table 1.

Assuming that the counts of all linguistic elements in the first and second utterances are $N_1=10000$ and $N_2=10000$ respectively, and the respective linguistic elements to be counted in the first and the second utterance are the same, both including "curse words", "swear words" and "foul words" discussed with Table 1. It is to be noted that although the linguistic elements is counted per category in this example, this is only an example of determining the counts of respective linguistic elements, and it is also possible that the linguistic elements are counted individually without introducing the category. In addition, it is also possible that the weights are assigned per different linguistic element without introducing the category.

The following Table 2 shows the counts of the respective linguistic elements in the first and second utterances and the corresponding weights. The regulation parameter is also R=500 as described in the above.

TABLE 2

| Respective Linguistic Elements | The First Utterance | | The Second Utterance | |
|---|---|---|---|---|
| | Counts | Weights | Counts | Weights |
| Curse words | $c_{11} = 30$ | $w_{11} = 0.4$ | $c_{21} = 20$ | $w_{21} = -0.2$ |
| Swear words | $c_{12} = 10$ | $w_{12} = 0.8$ | $c_{22} = 5$ | $w_{22} = -0.4$ |
| Foul words | $c_{13} = 5$ | $w_{13} = 1$ | $c_{23} = 10$ | $w_{23} = -0.5$ |

The personality score $P_1$ is calculated using Expression 2 as $P_1=0.70$. As a comparison, according to Expression 1, the personality score P calculated based only on the utterance from the first interlocutor in the dialog is P=1.25 which is larger than $P_1$ calculated based on utterances from both the first and second interlocutors.

According to the embodiment of the present disclosure, the utterances from the second interlocutor as dialog context which may affect the utterance of the first interlocutor are also considered in determining the personality of the first interlocutor, and thus the influence by the dialog context (i.e. the second interlocutor's utterance) may be considered. In this way, the personality of the first interlocutor may be determined based more on the nature of the first interlocutor than on the special situation involved in the dialog.

Figure 6:
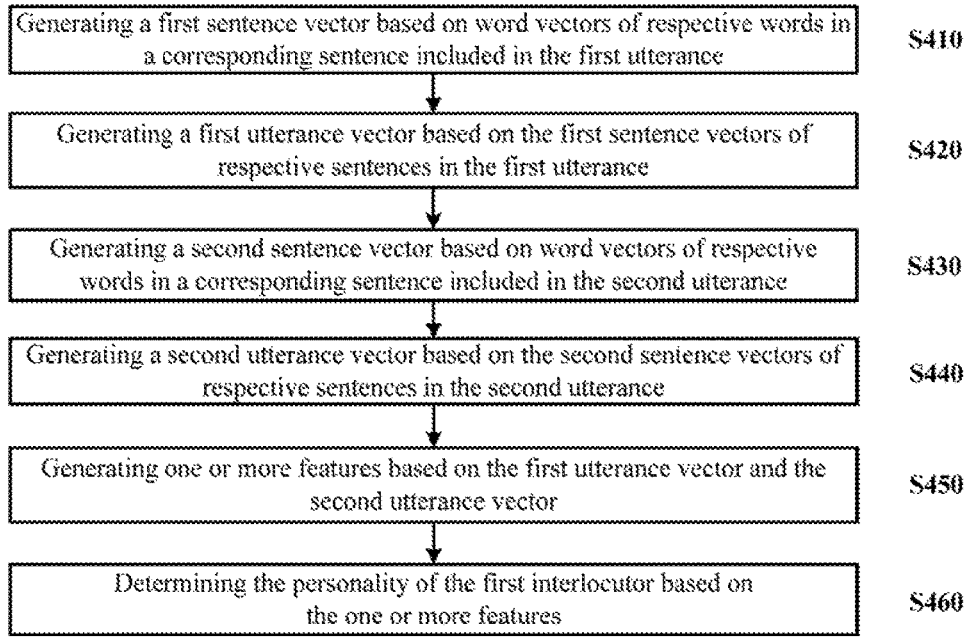
FIG. 6 is a flow chart depicting computer-implemented method according to an embodiment of the present disclosure.
Figure 7:
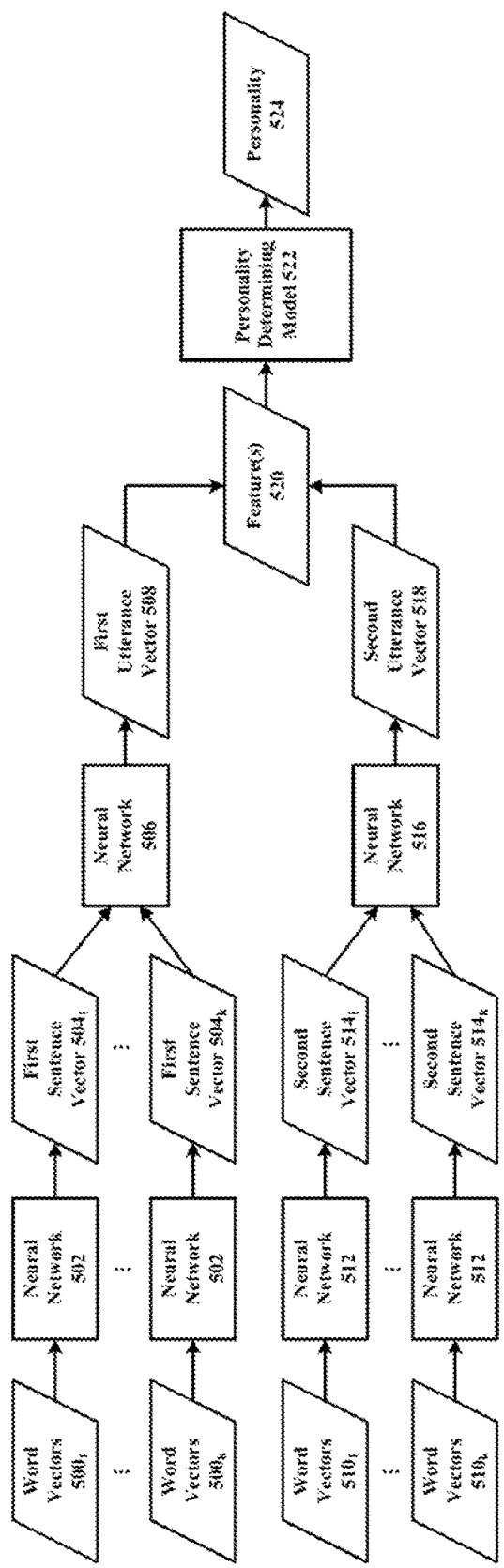
FIG. 7 is a schematic diagram depicting an system according to an embodiment of the present disclosure.

Referring to FIGS. 6 and 7, an exemplary computer-implemented method 400 and the corresponding exemplary system for context-based personality determination according to an embodiment of the present disclosure will be described. In the following, the term "word" has a general meaning which may include an emoji and the like.

The method 400 is another implementation of the method 200, in which the feature(s) is generated based on utterance vectors of the first and second utterance. In this embodiment, the feature(s) is generated based on first and second utterance vectors which characterize the semantic meanings of the utterances from the first and second interlocutors respectively, and the personality of the first interlocutor is determined based on the feature(s) thus generated. In the method 400, the steps S410~S450 may correspond to and be included in the feature generating step S210 of FIG. 4, and the step S460 may correspond to and be included in the personality determining step S220 of FIG. 4.

Steps S410 and S420 relate to generation of a first utterance vector from the first utterance of the first interlocutor.

In step S410, as shown in FIG. 7, a first sentence vector $504_1$ may be generated based on word vectors $500_1$ of respective words in a corresponding sentence included in the first utterance using a neural network-based model (e.g. a neural network) 502. Each of the word vectors $500_1$ may correspond to a word vector of a respective word in a corresponding sentence included in the first utterance. The first sentence vectors $504_2$~$504_k$ as shown in FIG. 7 may be similarly generated based on the word vectors $500_2$~$500_k$. k denotes the number of sentences in the first utterance.

Each word vector is vectorized from the corresponding word and may reflect the semantic meaning of the corresponding word. The vectorization will allow vector computation for words. According to some methods for generating word vectors, the distance between two word vectors corresponding to two words would be small if the two words have similar meanings, and vice versa. For example, according to some methods for generating word vectors, a word vector of "China" minus a word vector of "Beijing" may be approximately equal to a word vector of "France" minus a word vector "Paris".

In some embodiments, each word vector may be generated by word embedding methods, such as the word2vec method based on Continuous Bag-of-Words Model (CBOW) or Skip-gram Model. The dimension of a word vector may be any positive integer such as 100 or 1000 which may be determined depending on the tradeoff of the precision requirement and the computation capacity.

Similar to the word vectors, a sentence vector generated based on word vectors may characterize the semantic meaning of the corresponding sentence. The vectorization of sentences will allow vector computation for these sentences. According to some methods for generating sentence vectors, the distance between two sentence vectors corresponding to two sentences would be small if the two sentences have similar meanings. For example, a sentence vector of "Romeo loves Juliet." may have a smaller distance with a sentence vector of "The prince loves Cinderella." than a sentence vector of "The car stops.".

Further, although FIG. 7 shows that the word vectors $500_1 \sim 500_k$ are input to k neural networks 502 respectively in parallel, it should be appreciated that the word vectors $500_1 \sim 500_k$ may be input to one neural network 502 in a serial way.

In step S420, as shown in FIG. 7, a first utterance vector 508 may be generated based on the first sentence vectors $504_1 \sim 504_k$ of the respective sentences in the first utterance using a neural network-based model (e.g. a neural network) 506.

Similar to the word vector and sentence vector, the utterance vector generated based on sentence vectors may characterize the semantic meaning of the corresponding utterance. The vectorization of utterances will allow vector computation for these utterances. According to some methods for generating utterance vectors, the distance between two utterance vectors corresponding to two utterances would be small if the two utterances have similar meanings.

According to steps S410 and S420 described in the above, the first utterance vector is vectorized from the first utterance and may characterize the semantic meaning of the first utterance.

Steps S430 and S440 relate to generation of a second utterance from the second utterance of the second interlocutor, which are similar to steps S430 and S440 for generating the first utterance.

In step S430, as shown in FIG. 7, second sentence vectors $514_1 \sim 514_k$ may be respectively generated based on word vectors $510_1 \sim 510_k$ of respective words in a corresponding sentence included in the second utterance using a neural network-based model (e.g. a neural network) 512.

In step S440, as shown in FIG. 7, a second utterance vector 518 may be generated based on the second sentence vectors $514_1 \sim 514_k$ of respective sentences in the second utterance using a neural network-based model (e.g. a neural network) 516.

Since steps S430 and S440 for generating the second utterance vector may be similar to the steps S410 and S420 for generating the first utterance vector, the detailed description of the steps S430 and S440 is omitted herein. More specifically, any explanation for steps S410 and S420 as well as the related technical elements set forth in the above may readily and equally be applied to the steps S430 and S440.

According to steps S430 and S440 described in the above, the second utterance vector is vectorized from the second utterance and may characterize the semantic meaning of the second utterance.

Although FIG. 7 shows that the number of the first sentence vectors $504_1 \sim 504_k$ and the number of the second sentence vectors $514_1 \sim 514_k$ are the same, it should be appreciated that the numbers of the first sentence vectors and the second sentence vectors may be different depending on how many sentences are actually included in the first and second utterances respectively. The numbers of the first word vectors and the second word vectors may also be different.

It should be appreciated that the first and second sentence vectors may be generated by other methods, as long as the generated sentence vector may characterize the semantic meaning of the corresponding sentence. For example, existing sentence embedding methods may be used to generate the sentence vectors.

Further, the first and second utterance vectors may also be generated by other methods, as long as the generated utterance vector may characterize the semantic meaning of the corresponding utterance.

In some embodiments, neural networks 502, 506, 512 and 516 may be different from each other. In another embodiment, neural networks 502 and 512 may be the same model. In this case, word vectors $500_1 \sim 500_k$ and word vectors $510_1 \sim 510_k$ may be input to the same neural network 502 in a serial way. In a further embodiment, neural networks 506 and 516 may be the same model. In this case, the first sentence vectors $504_1 \sim 504_k$ and the second sentence vectors $514_1 \sim 514_k$ may be input to the same neural network 506 in a serial way. The structures of these neural network-based networks will be described later in more detail with reference to FIGS. 8A, 8B and 8C.

In step S450, as shown in FIG. 7, one or more features 520 may be generated based on the first utterance vector 508 and the second utterance vector 518.

In some embodiments, the feature(s) 520 may be a cascaded vector of the first utterance vector 508 and the second utterance vector 518. Further, it should be appreciated that feature(s) 520 may be of any other form as long as it contains semantic information characterized in the first utterance vector 508 and the second utterance vector 518. For example, there may be two features, one of which is based on the first utterance vector 508 and the other of which is based on the second utterance vector 518.

In step S460, the personality 524 of the first interlocutor may be determined based on the one or more features 520 by using a personality determining model 522. Exemplary implementations for the personality determination model 522 will also be described later.

Figure 8A:
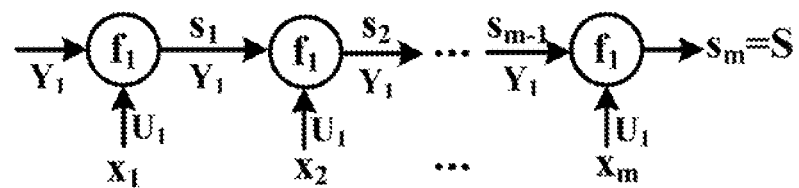
FIGS. 8A–8C are schematic diagrams depicting structures of neural network-based models according to an embodiment of the present disclosure.
Figure 8B:
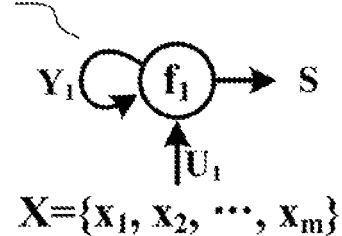
Figure 8C:
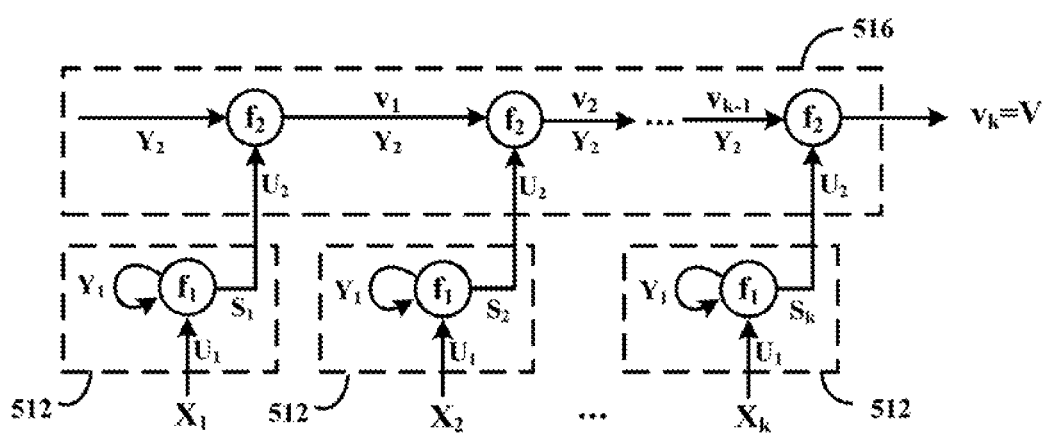

Referring to FIGS. 8A~8C, examples of the structures of the neural network-based models according to an embodiment of the present disclosure will be described, where only the structures of the neural networks 512 and 516 in FIG. 7 are shown in detail. The structures of the neural network 502 may be similar to that of the neural network 512, and the structure of the neural network 506 may be similar to that of the neural network 516, and thus the description for neural networks 502 and 506 are omitted herein.

According to the example as shown in FIGS. 8A~8C, each of the neural network-based models may be implemented based on a recurrent neural network (RNN).

FIG. 8A is a schematic diagram showing the structure of an RNN for generating a sentence vector according to an embodiment of the present disclosure. The RNN shown in FIG. 8A may correspond to the neural network 512, which will also be referred to as "RNN 512" in the following description.

As shown in FIG. 8A, the RNN 512 is an m-layer RNN with m hidden layers. Further, $x_1, x_2, \ldots, x_m$ are m inputs of the RNN 512, where $x_t \in R^{L \times 1}$, $t = \{1, 2, \ldots, m\}$ denotes a word vector of each word in a sentence, L is the dimension of the word vector and is an integer greater than 0, and m is the number of words in the sentence. Further, the collection of $x_1, x_2, \ldots, x_m$ may correspond to each set of the word vectors $510_1 \sim 510_k$ shown in FIG. 7.

Word vectors $x_1, x_2, \ldots, x_m$ are input to the RNN 512 sequentially to obtain hidden states $s_1, s_2, \ldots, s_m$ of the m hidden layers, where $s_t \in R^{L \times 1}$, $t=\{1, 2, \ldots, m\}$. Further, $f_1$ is an activation function of the RNN 512. The hidden state $s_t$ may be expressed by the following Expression 3, where so may be set to 0.

$$s_t = f_1(x_t, s_{t-1}) \quad \text{Equation 3}$$

FIG. 8A illustrates an exemplary activation function $f_1$, where $U_1 \in R^{L \times L}$ and $Y_1 \in R^{L \times L}$ are parameters of the RNN 512 for the activation function $f_1$. The activation function $f_1$ may be a nonlinear function such as tanh or ReLU. Thus the hidden state $s_t$ may be expressed as $$s_t = f_1(x_t, s_{t-1}) = f_1(U_1 x_t + Y_1 s_{t-1}).$$

It should be appreciated that other activation function with different parameters and different operations of the input may also be used in the RNN 512, so long as the activation function may output a state vector activated in response to the input word vectors $x_1, x_2, \ldots, x_m$.

According to Expression 3, the last hidden state $s_m$ is actually generated based on all the inputs $x_1, x_2, \ldots, x_m$, that is, word vectors of respective words in one sentence. Therefore, the last hidden state $s_m$ may characterize the semantic meaning of the whole sentence and thus may be used as the sentence vector $S=s_m \in R^{L \times 1}$ of the sentence. For example, the sentence vector S may correspond to each of the second sentence vectors $514_1 \sim 514_k$ as shown in FIG. 7.

FIG. 8B is a schematic diagram showing the structure of RNN 512 in a folded form. $X=\{x_1, x_2, \ldots, x_m\}$ denotes a set of word vectors in one sentence, which may correspond to each of the word vectors $510_1 \sim 510_k$.

FIG. 8C is a schematic diagram showing an structure of an RNN for generating an utterance vector according to an embodiment of the present disclosure. The RNN shown in FIG. 8C may correspond to the neural network 516, which will be called RNN 516 in the following description.

As shown in FIG. 8C, the RNN 516 is a k-layer neural network with k hidden layers, where k indicates the number of sentences in the second utterance. Sentence vectors $S_1, S_2, \ldots, S_k$ are k inputs of the RNN 516. Each of $S_1, S_2, \ldots, S_k$ is a last hidden state of the RNN 512 for a corresponding sentence, which may correspond to S shown in FIGS. 8A and 8B. Further, $S_1, S_2, \ldots, S_k$ may correspond to the second sentence vectors $514_1 \sim 514_k$ shown in FIG. 7 respectively.

Sentence vectors $S_1, S_2, \ldots, S_k$ are input to the RNN 516 sequentially to obtain hidden states $v_1, v_2, \ldots, v_k$ of the k hidden layers of the RNN 516, where $v_n \in R^{L \times 1}$, $n=\{1, 2, \ldots, k\}$. Further, $f_2$ is an activation function of the RNN 516. The hidden state $v_n$ may be expressed by the following Expression 4, where $v_0$ may be set to 0.

$$v_n = f_2(S_n, v_{n-1}) \quad \text{Equation 4}$$

FIG. 8C illustrates an exemplary activation function $f_2$, where $U_2 \in R^{L \times L}$ and $Y_2 \in R^{L \times L}$ are parameters for the activation function $f_2$ of the RNN 516. The activation function $f_2$ may be a nonlinear function such as tanh or ReLU. The hidden state $v_n$ may be expressed as $$v_n = f_2(S_n, v_{n-1}) = f_2(U_2 S_n + Y_2 v_{n-1}).$$

It should be appreciated that other activation function with different parameters may also be used in RNN 516, so long as the activation function may output a state vector activated in response to the input sentence vectors $S_1, S_2, \ldots, S_k$.

According to the Expression 4, the last hidden state $v_k$ is actually generated based on all the inputs $S_1, S_2, \ldots, S_k$, that is, the sentence vectors of the respective sentences in the second utterance. Therefore, the last hidden state $v_k$ may characterize the semantic meaning of the second utterance and thus may be used as the second utterance vector $V_2 \in R^{L \times 1}$ of the second utterance. For example, the utterance vector $V_2 = V_k$ may correspond to the second utterance vector 518 as shown in FIG. 7.

It should be appreciated that each of the neural network-based models according to embodiments of the present disclosure are not limited to RNNs whose specific structures are shown in FIGS. 8A–8C. Other types of RNNs such as a long-short term memory network (LSTM) and a gated recurrent unit (GRU) or other types of neural networks may also be applied to the neural network-based models according to embodiments of the present disclosure.

Although the exemplary structures of the neural networks 512 and 516 are described with reference to FIGS. 8A-8C, it is to be noted that the structures of the neural networks 502 and 506 may be the same as or similar to those of the neural networks 512 and 516 respectively. In addition, the parameters for the neural networks 502 and 506 may be the same as or may be different from those of the neural networks 512 and 516 respectively.

Referring back to FIG. 7, the personality determining model 522 will be described in details. The personality determining model 522 is used for determining the personality 524 based on the feature(s) 520.

In some embodiments, the personality determining model 522 may calculate a personality score as the personality 524 based on a linear transform of the feature(s) 520 using similar methods as described with reference to step S340 of FIG. 5.

For example, feature(s) 520 may be a cascaded vector $F=[V_1^T V_2^T]^T \in R^{2L \times 1}$, where $V_1 \in R^{L \times 1}$ corresponds to the first utterance vector 508 and $V_2 \in R^{L \times 1}$ corresponds to the second utterance vector 518. A weight vector $W \in R^{2L \times 1}$ may be set as a parameter for the linear transform of the personality determining model 522. The personality score $P_1$ may be calculated as $P_1 = F^T W$, where $P_1$ is a numeral value which may correspond to one dimension of the personality of the first interlocutor. As described in the above, there may be two features, one of which is based on the first utterance vector 508 and the other of which is based on the second utterance vector 518. For example, the first utterance vector $V_1$ and the second utterance vector $V_2$ may be used as the two features.

In some embodiments, the personality determining model 522 may calculate a personality score vector $P_1 \in R^{1 \times r}$ corresponding to more than one dimension of the personality based on a linear transform of the feature 502. For example, a weight matrix $W \in R^{2L \times r}$ may be set as a parameter for the linear transform of the personality determining model 522. The personality score vector may be calculated as $P_1 = F^T W$. Each column in the calculated personality score vector $P_1 \in R^{1 \times r}$ corresponds to a personality score for one dimension of personality.

In an implementation in which there are two or more features generated in step S450, different weight vectors or weight matrices may be used for the different features respectively, and the linear transformation may be performed based on the two or more features and the respective weight vectors or weight matrices.

In some embodiments, the personality score of the first interlocutor may also be calculated based on a non-linear transform of the feature or other types of processing of the feature, as long as the feature embodying the utterances of both the first and second interlocutors may function properly in determining the first interlocutor's personality.

In some embodiments, the personality determining model 522 may determine a discrete personality level based on the feature(s) 520 using similar methods as described with reference to step S340 of FIG. 5.

According to this embodiment as well, the utterance from the second interlocutor which may affect the utterance of the first interlocutor are also considered as dialog context in determining the personality of the first interlocutor, and thus the influence by the dialog context (i.e. the second interlocutor's utterance) may be considered. In this way, the personality of the first interlocutor may be determined based more on the nature of the first interlocutor than on the special situation involved in the dialog.

Hereinafter, methods for determining the parameters of the neural networks 502, 506, 512 and 516 and the personality determining model 522 will be described.

In some embodiments, each of the neural networks 502, 506, 512 and 516 may have fixed parameters. For example, the parameters $U_1$ and $Y_1$ for each of the neural networks 502 and 512 and the parameters $U_2$ and $Y_2$ for each of the neural networks 506 and 516 may be determined by training these neural networks as language predicting models separately in advance.

In an implementation of such embodiments, the parameter for the linear transform of the personality determining model 522 may be set manually according to psycholinguistic experiences.

In another implementation, the parameters for the linear transform of the personality determining model 522 may also be determined by calculating the parameters by using training samples so that the difference between the determined personality of the first interlocutor and a ground-truth personality of the first interlocutor is minimized. For example, linear regression methods such as the Least Squares Method (LSM) may be used to determine the parameters.

For example, the ground-truth personality is denoted as $P_0$ which has the same dimension of the personality score $P_1$. The parameter, for example, the weight vector or weight matrix W may be determined by minimizing the difference between $P_1$ and $P_0$, i.e., $\min\|P_1-P_0\|=\min\|F^T W-P_0\|$, where $\|.\|$ denotes the norm operation.

It should be appreciated that other methods may also be used for determining the parameters for the linear transform of the personality determining model 522, so long as the calculated parameters make the personality score be as close to the ground truth personality.

The above methods for determining the parameters for the linear transform of the personality determining model 522 may also be applied to determine the parameters for the linear transform of the feature as described with reference to step S340 of FIG. 5 (for example, the weight vector W in Expression 2).

In some embodiments, the personality score of the first interlocutor may also be calculated based on a non-linear transform of the feature or other types of processing of the feature. In this case, non-linear fitting methods or other curve fitting methods may be used to determine the parameters of the personality determining model 522 or parameters for step S340 of FIG. 5.

In some embodiments, parameters of at least one of the neural networks 502, 506, 512, 516 and the personality determining model 522 may be determined by modifying the parameters so that the difference between the determined personality 524 and a ground-truth personality is decreased. Such embodiments will be described with reference to FIG. 9.

Figure 9:
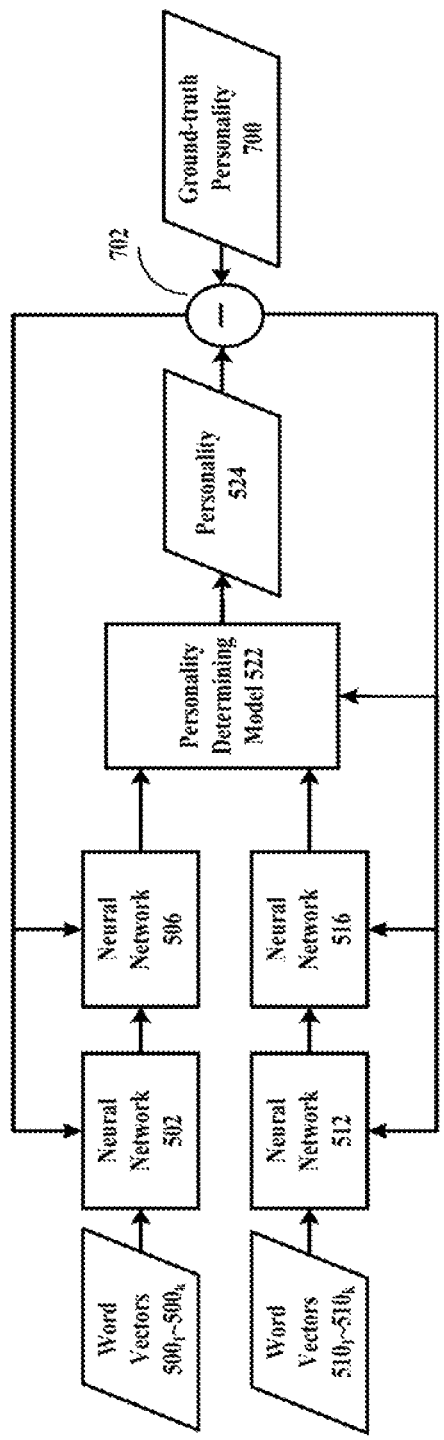
FIG. 9 is a schematic diagram showing a system for parameter determination according to an embodiment of the present disclosure.

FIG. 9 is a schematic diagram showing a system for parameter determination according to an embodiment of the present disclosure. In the system of FIG. 9, parameters of all models may be determined by training with a training sample and the corresponding ground-truth personality. In FIG. 9, the same reference sign as in FIG. 7 indicates the same block, and some blocks in FIG. 7 are omitted from FIG. 9 for the sake of brevity.

In FIG. 9, initially, the parameters of the neural networks 502, 506, 512, 516 and the personality determining model 522 may be set randomly. Denote the parameters of the neural network 502 as $U_1$, $Y_1$, the parameters of the neural network 512 as $U_2$, $Y_2$, the parameters of the neural network 506 as $U_1'$, $Y_1'$, the parameters of the neural network 516 as $U_2'$, $Y_2'$, and the parameters of the personality determining model 522 as W.

Word vectors $500_1$~$500_k$ of the training sample are input to neural network 502, and word vectors $510_1$~$510_k$ of the training sample are input to the neural network 512. In addition, the ground-truth personality 700 for the training sample is known in advance and is for comparison with the determined personality 524.

In response to the word vectors $500_1$~$500_k$ and the word vectors $510_1$~$510_k$, the personality 524 may be calculated based on all these word vectors by using the models with the parameters $U_1$, $Y_1$, $U_2$, $Y_2$, $U_1'$, $Y_1'$, $U_2'$, $Y_2'$ and W.

The personality 524 denoted as $P_1$ and a ground-truth personality 700 denoted as $P_0$ are input to a subtractor 702 to obtain a difference therebetween. In some embodiments, the difference may be expressed as $\|P_1-P_0\|=\|F^T W-P_0\|$. The parameters (e.g. $U_1$, $Y_1$, $U_2$, $Y_2$, $U_1'$, $Y_1'$, $U_2'$, $Y_2'$ and W) may be modified so as to make the difference decreased.

In some embodiments, gradients of the difference with respect to the parameters $U_1$, $Y_1$, $U_2$, $Y_2$, $U_1'$, $Y_1'$, $U_2'$, $Y_2'$ and W may be calculated and stochastic gradient descent methods may be used to modify the parameters so as to make the difference decreased. In some embodiments, back propagation algorithms may be used to modify the parameters in a way to decrease the gradients.

As described above, one training sample is input to the system shown in FIG. 9 at one time, and the parameters may be modified so that the difference between the personality 524 and the ground-truth personality 700 of the training sample is decreased. In some embodiments, this process may be repeated for a plurality of times with a plurality of training samples and the corresponding ground-truth personalities, until a predetermined number of training samples is used or until the difference between the personality 524 and the ground-truth personality 700 is lower than a predetermined threshold.

Although FIG. 9 shows an embodiment in which parameters of all of the neural networks 502, 506, 512 and 516 and the personality determining model 522 are determined, it should be appreciated that the parameters of one or more of the neural networks 502, 506, 512 and 516 and the personality determining model 522 may be fixed parameters and other parameters may be determined by modifying the other parameters so that the difference between personality 524 and the ground-truth personality 700 is decreased.

Further, it should be appreciated that other methods may be used to determine the parameters of at least one of the neural networks 502, 506, 512 and 516 and the personality determining model 522 so as to make the personality 524 to be as close to the ground-truth personality 700.

In some embodiments, the computer-implemented method, system and computer program product for context-based personality determination according to embodiments of the present disclosure may be implemented on a server. The server may collect utterances of interlocutors in dialogs to determine the personality of each interlocutor, so as to recommend personalized products and services.

In some embodiments, the computer-implemented method, system and computer program product for context-based personality determination according to embodiments of the present disclosure may also be implemented on a client, such as implemented on a computer or mobile phone as an application program.

Although some actions have been described in the above in a serial way or in a parallel way or in an order, these actions may also be performed a parallel way or in a serial way or in a different order instead. For example, step S420 may be performed prior to, after, or in parallel with step S440, and step S410 may be performed prior to, after, or in parallel with step S430. In addition, step S420 may be performed prior to, after, or in parallel with step S430, and step S410 may be performed prior to, after, or in parallel with step S440.

The present invention may be a system, a method, and/or a computer program product. The computer program product may include a computer readable storage medium (or media) having computer readable program instructions thereon for causing a processor to carry out aspects of the present invention.

According to an embodiment of the present disclosure, there is provided a system. The system may include one or more processors and a memory coupled to at least one of the one or more processors. The system may further include a set of computer program instructions stored in the memory and executed by at least one of the one or more processors in order to perform an action of generating one or more features based on a first utterance from a first interlocutor in a dialog and a second utterance from a second interlocutor in the dialog. The system may further include a set of computer program instructions stored in the memory and executed by at least one of the one or more processors in order to perform an action of determining a personality of the first interlocutor based on the one or more features.

According to an embodiment of the present disclosure, there is provided a computer program product. The computer program product may include a computer readable storage medium having program instructions embodied therewith. The program instructions may be executable by a device to perform a method. The method may include generating one or more features based on a first utterance from a first interlocutor in a dialog and a second utterance from a second interlocutor in the dialog. The method may further include determining a personality of the first interlocutor based on the one or more features.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will beapparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
generating one or more first features based on a first utterance from a first interlocutor in a dialog;
generating one or more second features based on a second utterance from a second interlocutor in the dialog; and
determining a personality of the first interlocutor based on the one or more first features and the one or more second features by:
identifying a first weight vector corresponding to the first utterance from the first interlocutor;
identifying a second weight vector corresponding to the second utterance from the second interlocutor; and
determining a personality score for the first interlocutor based on the one or more first features, the one or more second features, the first weight vector, and the second weight vector.

2. The computer-implemented method according to claim 1, wherein the generating the one or more first features based on the first utterance from the first interlocutor in the dialog comprises:
generating the one or more first features based on a plurality of counts of at least one respective linguistic elements in the first utterance.

3. The computer-implemented method according to claim 1, wherein the generating the one or more first features based on the first utterance from the first interlocutor in the dialog comprises:
generating the one or more first features based on a first utterance vector of the first utterance.

4. The computer-implemented method according to claim 3, wherein the generating the one or more first features based on the first utterance from the first interlocutor in the dialog further comprises:
generating, by use of a first neural network based model, the first utterance vector based on a plurality of first sentence vectors associated with a plurality of sentences in the first utterance.

5. The computer-implemented method according to claim 4, wherein the generating the one or more first features based on the first utterance from the first interlocutor in the dialog further comprises:
generating, by use of a second neural network based model, at least one of the plurality of first sentence vectors based on at least one of a plurality of word vectors associated with a first plurality of words, where the first plurality of words are in a sentence included in the first utterance.

6. The computer-implemented method according to claim 5, wherein the at least one of the plurality of word vectors and at least one of a plurality of second word vectors associated with a second plurality of words are input serially into the second neural network based model, and wherein the second plurality of words are in a given sentence included in the second utterance.

7. The computer-implemented method according to claim 5, wherein each of the first neural network based model and the second neural network based model is based on a recurrent neural network.

8. The computer-implemented method according to claim 1, wherein the determining the personality of the first interlocutor based on the one or more first features and the one or more second features comprises:
calculating a personality score of the first interlocutor based on a linear transform of the one or more first features and the one or more second features.

9. The computer-implemented method according to claim 5, wherein at least one parameter of at least one of the first neural network based model and the second neural network based model is determined by modifying the at least one parameter so that a difference between the determined personality of the first interlocutor and a ground-truth personality of the first interlocutor is decreased.

10. The computer-implemented method according to claim 8, wherein at least one parameter of the linear transform is determined by one of:
   i) modifying the at least one parameter so that a difference between the determined personality of the first interlocutor and a ground-truth personality of the first interlocutor is decreased; or
   ii) calculating the at least one parameter so that the difference between the determined personality of the first interlocutor and a ground-truth personality of the first interlocutor is minimized.

11. A system comprising:
   a processor; and
   a non-transitory computer-readable medium comprising instructions that, when executed by the processor, cause the processor to perform a method, the method comprising:
      generating one or more first features based on a first utterance from a first interlocutor in a dialog;
      generating one or more second features based on a second utterance from a second interlocutor in the dialog; and
      determining a personality of the first interlocutor based on the one or more first features and the one or more second features by:
         identifying a first weight vector corresponding to the first utterance from the first interlocutor;
         identifying a second weight vector corresponding to the second utterance from the second interlocutor; and
         determining a personality score for the first interlocutor based on the one or more first features, the one or more second features, the first weight vector, and the second weight vector.

12. The system according to claim 11, wherein the generating the one or more first features based on the first utterance from the first interlocutor in the dialog comprises:
   generating the one or more first features based on a plurality of counts of at least one respective linguistic elements in the first utterance.

13. The system according to claim 11, wherein the generating the one or more first features based on the first utterance from the first interlocutor in the dialog comprises:
   generating the one or more first features based on a first utterance vector of the first utterance.

14. The system according to claim 13, wherein the generating the one or more first features based on the first utterance from the first interlocutor in the dialog further comprises:
   generating, by use of a first neural network based model, the first utterance vector based on a plurality of first sentence vectors associated with a plurality of sentences in the first utterance.

15. The system according to claim 14, wherein the generating the one or more first features based on the first utterance from the first interlocutor in the dialog further comprises:
   generating, by use of a second neural network based model, at least one of the plurality of first sentence vectors based on at least one of a plurality of word vectors associated with a first plurality of words, where the first plurality of words are in a sentence included in the first utterance.

16. A computer program product comprising a computer readable storage medium having program instructions embodied therewith, wherein the program instructions are executable by a device to perform a method comprising:
   generating one or more first features based on a first utterance from a first interlocutor in a dialog;
   generating one or more second features based on a second utterance from a second interlocutor in the dialog; and
   determining a personality of the first interlocutor based on the one or more first features and the one or more second features by:
      identifying a first weight vector corresponding to the first utterance from the first interlocutor;
      identifying a second weight vector corresponding to the second utterance from the second interlocutor; and
      determining a personality score for the first interlocutor based on the one or more first features, the one or more second features, the first weight vector, and the second weight vector.

17. The computer program product according to claim 16, wherein the generating the one or more first features based on the first utterance from the first interlocutor in the dialog comprises:
   generating the one or more first features based on a plurality of counts of at least one respective linguistic elements in the first utterance.

18. The computer program product according to claim 16, wherein the generating the one or more first features based on the first utterance from the first interlocutor in the dialog comprises:
   generating the one or more first features based on a first utterance vector of the first utterance.

19. The computer program product according to claim 18, wherein the generating the one or more first features based on the first utterance from the first interlocutor in the dialog further comprises:
   generating, by use of a first neural network based model, the first utterance vector based on a plurality of first sentence vectors associated with a plurality of sentences in the first utterance.

20. The computer program product according to claim 19, wherein the generating the one or more first features based on the first utterance from the first interlocutor in the dialog further comprises:
   generating, by use of a second neural network based model, at least one of the plurality of first sentence vectors based on at least one of a plurality of word vectors associated with a first plurality of words, where the first plurality of words are in a sentence included in the first utterance.

* * * * *